(12) United States Patent
Eckstein et al.

(10) Patent No.: US 8,871,372 B2
(45) Date of Patent: *Oct. 28, 2014

(54) DEVICE THAT IS INTENDED FOR SUPPLYING POWER TO A MOTOR VEHICLE AND COMPRISES A COOLER BLOCK

(75) Inventors: Frank Eckstein, Hahnbach (DE); Bjoern Lath, Munich (DE); Hubertus Goesmann, Nattheim-Auernheim (DE); Micha Dirmeier, Munich (DE); Philipp Petz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/333,290

(22) Filed: Dec. 21, 2011

(65) Prior Publication Data
US 2012/0121946 A1     May 17, 2012

Related U.S. Application Data

(63) Continuation of application No. PCT/EP2010/002709, filed on May 4, 2010.

(30) Foreign Application Priority Data

Jun. 23, 2009   (DE) .......................... 10 2009 030 016

(51) Int. Cl.
| | |
|---|---|
| H01M 10/50 | (2006.01) |
| H01M 10/6554 | (2014.01) |
| B60R 16/04 | (2006.01) |
| H01G 9/28 | (2006.01) |
| H01M 10/613 | (2014.01) |
| H01M 10/625 | (2014.01) |
| B60L 11/18 | (2006.01) |
| H01G 9/00 | (2006.01) |
| H01M 10/42 | (2006.01) |
| H01M 2/10 | (2006.01) |

(52) U.S. Cl.
CPC ................. *B60R 16/04* (2013.01); *Y02E 60/13* (2013.01); *H01M 10/5053* (2013.01); *Y02T 10/705* (2013.01); *H01G 9/28* (2013.01); *H01M 10/5004* (2013.01); *H01M 10/5016* (2013.01); *B60L 11/1874* (2013.01); *B60L 11/1879* (2013.01); *Y02T 10/7022* (2013.01); *Y02T 10/7005* (2013.01); *H01G 9/155* (2013.01); *Y02E 60/12* (2013.01); *H01M 10/4264* (2013.01); *H01M 2/1077* (2013.01)
USPC ....................................................... 429/120

(58) Field of Classification Search
USPC ....................................................... 429/120
See application file for complete search history.

(56) References Cited

U.S. PATENT DOCUMENTS

| 5,514,956 | A | | 5/1996 | Maxfield et al. |
| 5,585,204 | A | * | 12/1996 | Oshida et al. ................... 429/62 |

(Continued)

FOREIGN PATENT DOCUMENTS

| DE | 26 24 593 A1 | 12/1977 |
| DE | 32 23 532 A1 | 12/1983 |

(Continued)

OTHER PUBLICATIONS

International Search Report dated Aug. 26, 2010 with English translation (four (4) pages).

*Primary Examiner* — Muhammad Siddiquee
(74) *Attorney, Agent, or Firm* — Crowell & Moring LLP (57) ABSTRACT

A device for supplying power to a motor vehicle, in particular a passenger vehicle, truck or motorcycle, includes one or more storage cell modules, each of which includes one or more electrochemical storage cells and/or double layer capacitors that are arranged next to and/or on top of one another. The device has a cooler block that includes a holder for the storage cell modules and a structure for dissipating the heat emitted by the storage cell modules. The cooler block has a force absorbing device with at least one—in particular, plate-shaped—force absorbing element, by which in the case of a crash a force acting on the device is absorbed and is deflected around the storage cell modules.

20 Claims, 7 Drawing Sheets

(56) References Cited

U.S. PATENT DOCUMENTS

| | | |
|---|---|---|
| 5,612,606 A | 3/1997 | Guimarin et al. |
| 7,217,473 B2 * | 5/2007 | Ovshinsky et al. ............ 429/62 |
| 2002/0195237 A1 | 12/2002 | Luz et al. |
| 2003/0027031 A1 | 2/2003 | Baldauf et al. |
| 2005/0018401 A1 | 1/2005 | Stocken et al. |
| 2005/0170241 A1 | 8/2005 | German et al. |
| 2006/0078789 A1 | 4/2006 | Wegner |
| 2006/0216579 A1 | 9/2006 | Cho |
| 2007/0014924 A1 | 1/2007 | Mertens et al. |
| 2007/0018610 A1 | 1/2007 | Wegner |
| 2007/0269703 A1 | 11/2007 | Kaye |
| 2008/0131230 A1 | 6/2008 | Burgstein et al. |
| 2008/0218966 A1 | 9/2008 | Lang et al. |
| 2008/0305388 A1 | 12/2008 | Haussman |
| 2009/0023059 A1 | 1/2009 | Kinoshita et al. |
| 2009/0142628 A1 | 6/2009 | Okada et al. |
| 2010/0015512 A1 | 1/2010 | Inoue et al. |
| 2010/0119921 A1 | 5/2010 | Meijering et al. |
| 2010/0173191 A1 | 7/2010 | Meintschel et al. |
| 2010/0190049 A1 | 7/2010 | Kawase et al. |
| 2011/0090614 A1 | 4/2011 | Guerin et al. |
| 2011/0132580 A1 | 6/2011 | Herrmann et al. |
| 2011/0267778 A1 | 11/2011 | Eckstein et al. |

FOREIGN PATENT DOCUMENTS

| | | |
|---|---|---|
| DE | 195 17 733 C1 | 7/1996 |
| DE | 103 19 1984 A1 | 12/2004 |
| DE | 10 2004 027 694 A1 | 8/2005 |
| DE | 10 2004 019 382 A1 | 11/2005 |
| DE | 10 2005 031 504 A1 | 1/2007 |
| DE | 10 2006 059 989 A1 | 6/2008 |
| DE | 10 2007 011 026 A1 | 9/2008 |
| DE | 10 2007 013 906 A1 | 10/2008 |
| DE | 20 2007 017 390 U1 | 4/2009 |
| DE | 10 2008 027 293 A1 | 12/2009 |
| DE | 10 2008 056 859 A1 | 5/2010 |
| DE | 10 2009 004 543 A1 | 7/2010 |
| DE | 10 2009 035 492 A1 | 2/2011 |
| EP | 0 580 412 A1 | 1/1994 |
| EP | 1 271 085 A2 | 1/2003 |
| EP | 1 986 250 A1 | 10/2008 |
| EP | 1 990 849 A1 | 11/2008 |
| EP | 1 990 860 A1 | 11/2008 |
| EP | 1990849 A1 * | 11/2008 |
| EP | 2 065 963 A2 | 6/2009 |
| EP | 2 104 121 A1 | 9/2009 |
| FR | 2 883 670 A1 | 9/2006 |
| FR | 2 924 857 A1 | 6/2009 |
| JP | 2004-031281 A | 1/2004 |
| JP | 2006-318871 A | 11/2006 |
| WO | WO 2001/048845 A2 | 7/2001 |
| WO | WO 03/103083 A2 | 12/2003 |
| WO | WO 2008/104340 A1 | 9/2008 |
| WO | WO 2009/014071 A1 | 1/2009 |

* cited by examiner

DEVICE THAT IS INTENDED FOR SUPPLYING POWER TO A MOTOR VEHICLE AND COMPRISES A COOLER BLOCK

CROSS-REFERENCE TO RELATED APPLICATIONS

This application is a continuation of PCT International Application No. PCT/EP2010/002709, filed May 4, 2010, which claims priority under 35 U.S.C. §119 from German Patent Application No. DE 10 2009 030 016.3, filed Jun. 23, 2009, the entire disclosures of which are herein expressly incorporated by reference.

This application contains subject matter related to U.S. application Ser. No. 13/333,243, entitled "Device that is Intended for Supplying Power to a Motor Vehicle and Comprises a Cooler Block," filed on even date herewith.

BACKGROUND AND SUMMARY OF THE INVENTION

The invention relates to a device for supplying power to a motor vehicle, in particular a passenger vehicle, truck or motorcycle. Such a device includes one or more storage cell modules, each of which has one or more electrochemical storage cells and/or double layer capacitors that are arranged next to and/or on top of one another. Furthermore, the device includes a cooler block that has a holder for the storage cell module(s) and a structure for dissipating the heat emitted by the storage cell module(s). Furthermore, the invention relates to a cooler block for such a device.

The storage cells and/or double layer capacitors of a storage cell module are typically connected together in series and/or in parallel by electrical means, in order to be able to provide sufficient energy, for instance, for an electric motor. A device for supplying power may include a plurality of such storage cell modules. In the case of an accident it must be ensured that the storage cells and/or double layer capacitors of the storage cell module are not damaged, because any leaking electrolyte could lead to damage to the environment and/or humans. Furthermore, a smashed storage cell could lead to a short circuit in the cell. This situation can cause a thermal event in the storage cell that in turn could lead to degassing, an explosion or a fire in the storage cells.

Furthermore, the electrochemical storage cells and/or double layer capacitors may reach considerable temperatures under normal operating conditions, so that it is necessary to cool them. The cooling of electrochemical storage cells and/or double layer capacitors is done from the outside. If sufficient cooling cannot be ensured with a sufficient degree of certainty, then the immediate result may be defects that cannot be reconciled in a cost-effective way with the requirements relating to the service life when used in automobiles.

Therefore, the object of the present invention is to provide a device for supplying power to a motor vehicle as well as a cooler block, both of which exhibit high protection against damage to the storage cells and their mechanical attachment elements.

The invention provides a device that is intended for supplying power to a motor vehicle, in particular a passenger vehicle, truck or motorcycle and that comprises one or more storage cell modules, each of which comprises one or more electrochemical storage cells and/or double layer capacitors that are arranged next to and/or on top of one another, and comprises a cooler block that comprises a holder for the storage cell module(s) and a structure for dissipating the heat emitted by the storage cell module(s). The cooler block comprises a force absorbing device with at least one—in particular, plate-shaped—force absorbing element, by which in the case of a crash a force acting on the device is absorbed and is diverted around the storage cell modules.

By providing the force absorbing device with at least one force absorbing element, for example, a crash plate, protection is provided for the storage cells and/or the double layer capacitors of a storage cell module. When a component of the vehicle body is deformed and makes mechanical contact with the device, the forces are then absorbed by the force absorbing device and routed around the storage cell modules. This feature makes it possible to prevent the storage cell modules from being damaged up to the occurrence of a maximum force In one embodiment of the device, the at least one force absorbing element of the force absorbing device projects at least in sections beyond the cooler block. This feature ensures that when a component of the vehicle body is deformed in the area of the device, force is applied to those sections of the at least one force absorbing element that project beyond the cooler block, so that the force is guided around the storage cell modules.

In an additional embodiment, the at least one force absorbing element for force guidance interacts with one or more component(s) surrounding the cooler block. In this embodiment the force absorbing element does not have to project beyond the cooler block. In order to be able to assume, nevertheless, the protective function, there are suitable components, which in the case of a deformation of a body component in the area of the device project into the cooler block by the same amount that the at least one force absorbing element is set back. This approach also maintains the force conducting path. One advantage of this feature lies in the fact that the fabrication of the device is simplified.

Given a plurality of force absorbing elements, some of them will project at least in sections beyond the cooler block and force will be applied directly to them in the event of a deformation, whereas the other force absorbing elements will interact with one or more components surrounding the cooler block, in order to maintain the force conducting path.

In order to be able to make the inventive device for supplying power to a motor vehicle stable and yet compact, it is expedient that the at least one force absorbing element extends laterally past one of the storage cell modules. As an alternative or in addition, the at least one force absorbing element may be arranged between two storage cell modules. Then, maximum protection for the storage cell modules is provided if at least one of the force absorbing elements is provided between two adjacent storage cell modules.

In another embodiment, at least two force absorbing elements, which are assigned to different and adjacent holders, are arranged in succession in a force conducting direction. The provision of two successive force absorbing elements can be provided, for example, if the device has two holders that are separate from each other and are arranged in a force effective manner one after the other, and if at least one storage cell module is inserted into each holder. Such an embodiment is advantageous, for example, for reasons relating to handling during fabrication and for optimal heat dissipation. To the extent that it is possible in terms of installation, the force absorbing elements may also be constructed as one piece.

In an additional embodiment, the at least one force absorbing element has pegs, which extend through the cooler block and project beyond the same. Since the pegs of the force absorbing elements project beyond the cooler block, it is ensured that in the case of a deformation of the body of the vehicle these pegs will make contact with the deforming body components as the first elements.

If two force absorbing elements, which are assigned to different and adjacent holders, are arranged in succession in a force conducting direction, it is also expedient for the respective pegs of the successive force absorbing elements for force guidance to be arranged so as to be juxtapositioned relative to each other. As a result, the force transfer from those force absorbing elements, to which force is applied by a deforming body component of the vehicle, is passed on to the downstream force absorbing element without exposing the respective holders or more specifically the storage cell modules to a damaging force. It is expedient to design the respective pegs in such a way that a slight displacement of the force absorbing elements due to the crash does not lead to a deformation of the heat dissipating structure, in particular, the coolant conveying lines.

It is expedient for the at least one force absorbing element to extend in the direction of a longitudinal axis of the vehicle or a transverse axis of the vehicle, when the device is installed into the vehicle. This approach takes into consideration the installation situation of the device in the motor vehicle as well as the typical accident scenarios. The installation situation depends, inter alia, on the location at which the device shall be installed in the vehicle and the most probable direction that the vehicle body will deform in the case of an accident.

It is possible to make the device even more stable and to improve the heat dissipation if the heat dissipating structure is provided on at least one side of the holder and if the cooler block includes a clamping device that is designed to generate a predefined force, by which the structure for dissipating heat can be pressed against a respective storage cell module. This advantageous embodiment is based on the consideration that a minimum pressure has to be generated between the components, in order to avoid air inclusions having a high thermal resistance and to provide good thermal contact. Furthermore, this minimum pressure can prevent the components from moving relative to each other. In a device for supplying power the necessary minimum pressure is provided by the clamping device. The clamping device generates the necessary force between the structure for dissipating heat and a respective storage cell module, in order to improve the thermal contact between the storage cell modules and the heat dissipating structure.

One embodiment of the clamping device comprises a number of connecting members that are designed to generate the predefined force and to transmit this predefined force directly or indirectly to the heat dissipating structure. The following description will show, inter alia, that the connecting members may be a simple screw or a similar fastener. In principle, any type of connecting member that can generate the predefined force would be suitable.

According to an additional embodiment, the heat dissipating structure comprises a cooling plate that is mounted on at least the opposing sides of the holder and that includes cooling ducts that are intended for a coolant or a refrigerant and that are flow-connected on an end side of the holder by way of flexible cooling ducts. During installation the flexible—for example, curved—cooling ducts compensate for the spacing differential between the cooling plates after force has been applied by yielding and, for example, bending outwards or deflecting in the course of the tightening process.

According to another embodiment, the sides of the heat dissipating structure that face away from the storage cell module(s) exhibit a clamping plate, wherein the number of connecting members connects together the clamping plates in a force and/or form-fitting manner. A structurally more stable cooler block is provided by providing the clamping plates, in addition to the heat dissipating structure. In particular, the clamping plates are made of a metal or a synthetic plastic material. In this case it is especially preferred that the clamping device, in particular the clamping plate, be made of a thermally insulating material or comprise a thermally insulating material. For example, a thermally insulating layer can be applied on the clamping plate made of metal. This strategy can improve the cooling efficiency of the device for supply power.

Furthermore, it is expedient for installation reasons that prior to the application of force by the number of connecting members the clamping plate exhibits a curvature that is designed opposite to the direction of force. This feature makes it possible to achieve good thermal contact in the center of the longitudinal axis of a respective storage cell or rather a respective storage cell module. Typically, this region exhibits the maximum sagging of the cooling plate or more specifically the clamping plate. In order to counteract such a sagging, the clamping plate, which serves to be distorted, is pre-bent in the opposite direction. This distortion allows the clamping plate to be forced into a planar shape. At this point the spring force acts on the heat dissipating structure and, thus, helps to generate the desired force between the clamping plate and the respective storage cell modules.

In an alternative embodiment the number of connecting members is connected together in a force and/or form-fitting manner to the cooling plates that are mounted on the opposing sides of the holder. This embodiment ensures that the cooling plates are adequately dimensioned in order to be able to absorb the forces generated by the connecting members. This requirement may be satisfied, for example, by the material thickness of the cooling plates or the local reinforcements in the area of the force introduction. On the other hand, the structure of the device is improved by the stable cooling plates.

Furthermore, it is provided that the number of connecting members is connected directly or indirectly to the cooling plates or the clamping plates by way of one or more support rails that are made of a rigid material. Owing to the provision of support rails, the force does not have to be introduced directly into the cooling plates or the clamping plates. Rather, the forces are introduced locally into the support rails, which distribute the forces over a larger area. The support rails may be made, for example, of a metal or a correspondingly rigid synthetic plastic material. They can also be integrated into the clamping plates. Furthermore, the support rails serve to secure in position at least one force absorbing element (perpendicular to the force conducting direction), because their pegs extend through the corresponding recesses of the support rails.

In order to minimize the construction space required for the device according to the invention, it is also provided that at least some of the number of connecting members extend through the holder. In particular, a respective connecting member can extend laterally past a storage cell module or between two storage modules. In this case it is expedient for the force absorbing element and the pegs of the force absorbing element to extend in the direction of the number of connecting members. It is especially advantageous if the connecting members and the force absorbing element are arranged spatially relative to each other such that they can make do with a minimum amount of design space.

Moreover, it is expedient that a storage cell module comprise a plurality of storage cells and/or double layer capacitors that are connected together by way of thermally conducting and mechanically rigid profiles, wherein the clamping device presses the heat dissipating structure against the profiles. The profiles may be constructed, for example, as extruded profiles made of aluminum. In the case of a crash the profiles conduct a force, acting on the device, around the storage cells or more specifically away from the storage cells. In addition to the force absorbing elements, the profiles ensure in this way that the storage cells are protected against damage. An additional purpose of the profiles consists of conducting the heat from the storage cells to the heat dissipating structure. The shape of the profiles makes it possible to conduct the heat away from the storage cells over a large area.

In order to secure the device on the vehicle, the clamping device may have, according to another advantageous embodiment, at least one fixed bearing (for example, in the shape of an eyelet) on one side of the holder and at least one floating bearing on the other side of the holder. This feature of securing the device on one side ensures that the clamping plates can be adjusted over the service life, as a result of which the cooling and clamping plates always stay in thermal contact with the modules. On the other hand, the unilateral mounting has its advantages in the case of a crash because force is introduced into the device only on one side, while the other side remains freely moveable up to a certain degree of freedom. The fixed bearing and/or the sliding bearing may be formed optionally on one of the clamping plates and/or the support rails. It is expedient for one side wall of the device to have all of the fixed bearings, while the opposite side wall of the device has the sliding bearings.

An especially simple handling and installation of the device according to the invention results from a cooler block that is self-supporting. In this way it is possible to acquire different components of the device from different manufacturers and to combine them at a later point in time. In particular, the cooler block can be provided as a separate component. Then, the storage cell modules can be inserted into the cooler block and clamped together with it at the manufacturer of the device, for example at the manufacturer of the vehicle or the storage modules.

The invention also provides a cooler block for a device for supplying power to a motor vehicle, in particular a passenger vehicle, truck or motorcycle, wherein the device for supplying power comprises one or more storage cell modules, each of which comprises one or more electrochemical storage cells and/or double layer capacitors that are arranged next to and/or on top of one another. The cooler block comprises a holder for the storage cell module(s) and a structure for dissipating the heat emitted by the storage cell module(s). The cooler block comprises a force absorbing device with at least one—in particular, plate-shaped—force absorbing element, by which in the case of a crash the device can absorb the force acting on the device and can deflect this force around the storage cell modules.

The inventive cooler block, which represents in essence a combination of a heat dissipating structure and a clamping device, has the same advantages as those described in conjunction with the device according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
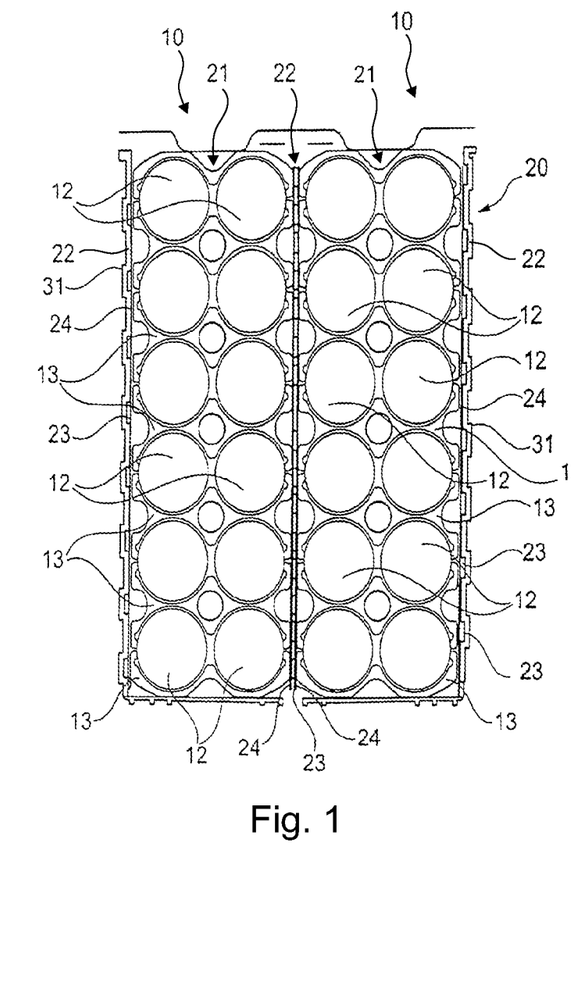
FIG. 1 is a schematic cross sectional view of an exemplary cooler block according to the invention.

FIG. 1 is a schematic cross sectional view of an exemplary cooler block 20 according to the invention. The cooler block 20 includes a respective holder 21 for, for instance, two storage cell modules 10, which are arranged side by side. Each of the storage cell modules 10 has a number of electrochemical storage cells 12 and/or double layer capacitors that are arranged, for example, side by side in two rows. Each row includes, for example, only six storage cells 12 that lie one on top of the other.

In order to secure the storage cells 12 by mechanical measures and to improve the heat dissipation, the storage cells 12 are coupled to thermally conducting profiles 13. The profiles 13 are, for example, extruded profiles made of aluminum. The cross sectional shape of a respective profile 13 is adapted to the shape of the storage cells 12, so that two adjacent storage cells 12 come to rest in one profile 13. In this case, the resulting wing-shaped profiles 13 are designed so as to be flat on the side, so that these profiles can be brought into a large area contact with a coolant or refrigerant conveying structure 22 of the cooler block 20.

The structure 22 conveying the coolant or refrigerant includes a cooling plate 24 on the opposing sides of a respective holder 21. A number of cooling ducts 23 extend on the sides of the cooling plate that face away from the storage cell modules 10. The cooling plates are made preferably of aluminum. The cooling ducts 23 may be constructed, for example, as multiport tubes (so-called flat tubes). The cooling ducts 23 extend in parallel to a longitudinal axis of a respective storage cell into the sheet plane of the drawing. In order to be able to dissipate the heat that is generated twice between the two storage cell modules 10, twice the number of cooling ducts 23 may or may not be provided between the two cooling plates 24 that are assigned to the respective storage cell module 10. This heat dissipation also results from the fact that the cooling ducts, which are disposed on the opposing sides of a respective holder 21, are flow connected to each other by the cooling duct sections (cf. FIG. 3) that are configured as so to be curved on the end side of the holder 21.

The outside of the structure 22 conveying coolant or refrigerant has a clamping plate 31, which is connected together by a number of connecting members (not illustrated in FIG. 1). The clamping plates 31 generate a force, by which the coolant or refrigerant conveying structure 22, that is, the cooling plates 24, are pressed against a respective storage cell module 10. The clamping plates 31 as well as the connecting members (not illustrated) are an essential part of a clamping device 30, which together with the coolant or refrigerant conveying structure 22 forms the cooler block 20. The connecting members connect together the clamping plates 31 in a force- and/or form-fitting manner. The clamping plates 31 are made preferably of a metal or a synthetic plastic material. In particular, the clamping plates 31 are made of a material that is thermally insulating, in order to enable or rather help dissipate the heat, generated in the storage cells, by means of the coolant or refrigerant conveying structure 22. If metal is used as the material for the clamping plates 31, then this metal is provided with an insulating layer in order to be able to provide the thermal insulation.

It is easy to see from the cross sectional view in FIG. 1 that the clamping plates 31 are pulled around under the respective storage cell modules 10. In this lower floor area the clamping plates 31 form an end of the cooler block 20. In addition, the shaping of the clamping plates 31 makes it possible to improve the intrinsic stability of the cooler block 20. It is preferred that the cooler block 20 have a self-supporting structure, because then it is possible to handle and fabricate the inventive device for supplying power in an especially easy way. Therefore, if necessary, it is also practical to provide the clamping plates 31 on their side faces, facing away from the storage cell modules 10, with a profiling that can serve, as shown, for example, in FIG. 1, to receive the cooling ducts and to enable an improved stability and rigidity of the clamping plates 31 and, thus, the cooler block 20.

Owing to the clamping device 30 in the form of clamping plates 31 as well as the connecting members connecting said plates, a force is generated, by which the structure 22 conveying the coolant or refrigerant is pressed against a respective storage cell module 10. Stated more precisely, the cooling plates 24 are pressed against the heat conducting profiles 13 of the storage cell modules 10. Owing to the minimum pressure that is generated between the components, it is possible to avoid air inclusions that exhibit a high thermal resistance. This feature makes it possible to produce good thermal contact between the heat dissipating profiles 13 and the coolant or refrigerant conveying structure 22, so that good cooling of the storage cells 12 is guaranteed. Furthermore, the pressure of the clamping device does not allow the components to move relative to each other, because the conditions for frictional locking are met due to the generated force.

Insofar as the clamping plates 31 are made of a steel plate and the cooling plates 24 are made of aluminum, a corrosion inhibiting layer is provided between the clamping plates 31 and the coolant or refrigerant conveying structure 22 in order to avoid corrosion. The corrosion inhibiting layer can be applied, for example, on the clamping plates 31. There is no need to provide such a corrosion inhibiting layer, if the clamping plates are made, for example, of stainless steel or a synthetic plastic material.

Figure 11A:
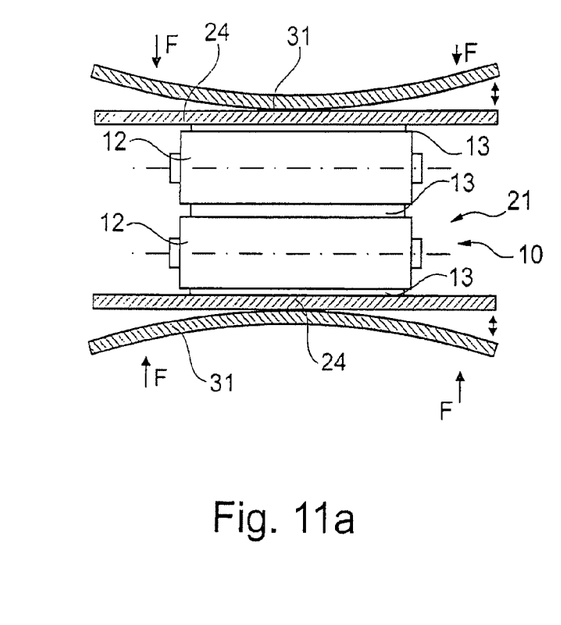
FIGS. 11a and 11b are, in each case, a top view of a cooler block illustrating the procedure for securing it in place.
Figure 11B:
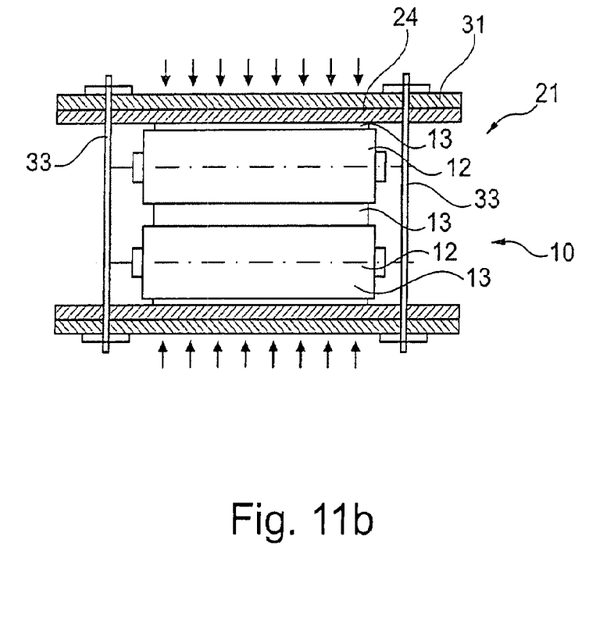

In order to produce good thermal contact in the extended direction of the storage cells 12 (that is, in the direction of the sheet plane), the sagging of the cooler block 20 and, in particular, the clamping plates 31 must be taken into consideration. In order to counteract such a sagging, the clamping plates 31 are pre-bent in the direction opposite the subsequent direction of force. This feature is shown in a schematic top view in FIG. 11a, where the cooler block is designed in the exemplary embodiment to receive a single storage cell module 10. At the same time it is obvious from FIG. 11a that the clamping plates 31 are constructed in such a way that without the force application by means of the connecting members, the plates are set apart from the assigned cooling plate 24 in the area of the ends of a respective storage cell 12. By clamping together the clamping plates 31 by use of the connecting members 33 (see FIG. 11b), the clamping plates are bent straight, and a spring force of the clamping plates acts additionally on the cooling plates of the cooler block 20. This feature is shown in the schematic drawing of FIG. 11b, where it is easy to see that the connecting elements 33 extend laterally past the storage cell module 10. This design variant shown in FIG. 11b is preferred, on the one hand, for design space minimizing reasons and, on the other hand, for thermal reasons.

A connecting member 33 comprises, for example, a screw that extends into a cylindrical nut with an internal thread. At the same time the nut applies force to the clamping plate 31 on one side of the holder 21 or, more specifically the storage cell module 10, and the screw applies force to the clamping plate 31 on the opposite side of the holder 21 or, more specifically the storage cell module 10. The cylindrical section of the nut is preferably constructed in such a way that at the predefined force generated by the screw, the screw does not protrude beyond the rear end of the nut. This feature provides an adequately long actuating path for the screw so that the screw does not project beyond a lateral face of the device for generating power. Owing to the adequate dimensioning of the length of the nut it is also possible to carry out a pre-assembly, according to which the screw and the nut are already connected together before the storage cell modules are inserted into the respective holder of the cooler block. In order to generate the predefined force, the screws need only be rotated further into the nuts.

In principle, connecting members that are designed differently may be used in the power supplying device according to the invention, as long as it is ensured that the predefined force is applied to the structure conveying the coolant or refrigerant. In particular, the connecting member could also be formed by a crimped spring steel spoke.

Figure 2:
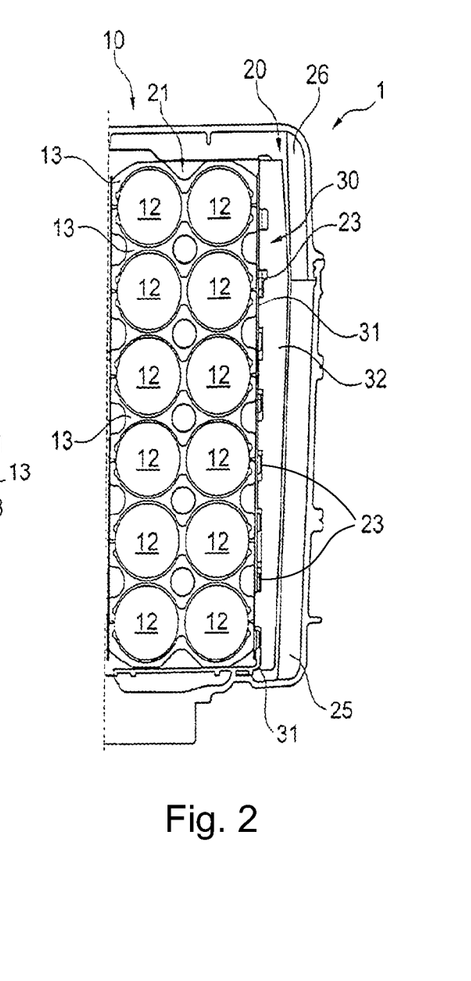
FIG. 2 is a partial cross sectional view of a device for supplying power according to an embodiment of the invention.

FIG. 2 is a partial cross sectional view of an exemplary inventive device for supplying power. In this drawing only the right storage cell module 10, depicted in FIG. 1, is shown in its holder 21 of the cooler block 20. Furthermore, the drawing shows a housing surrounding the cooler block 20. This housing is formed from a first housing part 25, a housing trough, and a second housing part 26, a cover lid of the housing. The first and second housing parts 25, 26 may be made, for example, of a synthetic plastic material or an aluminum casting. After the clamping together by the described clamping device has been carried out and after all of the electrical connections of the storage cell modules have been produced, the cooler block 20, which is populated with the storage cell modules 10, is inserted into the first housing part 25 and closed with the second housing part 26. Furthermore, FIG. 2 shows a support rail 32 of the clamping device 30. A plurality of such support rails 32 are provided along a respective side face of the cooler block 20. The support rails 32, which are made of a rigid material, serve to connect the connecting members 33 indirectly to the clamping plates 31. Hence, the force generated by the connecting elements does not act directly on the clamping plates 31, but rather on the support rails 32, as a result of which the force is distributed over the surface area of the support rails and is transmitted to the clamping plates 31.

On the basis of the aforesaid, the results from the described functionality of the support rails 32 includes as a matter of fact that they are arranged in the area between the storage cell modules that are juxtapositioned in the longitudinal direction.

Figure 3:
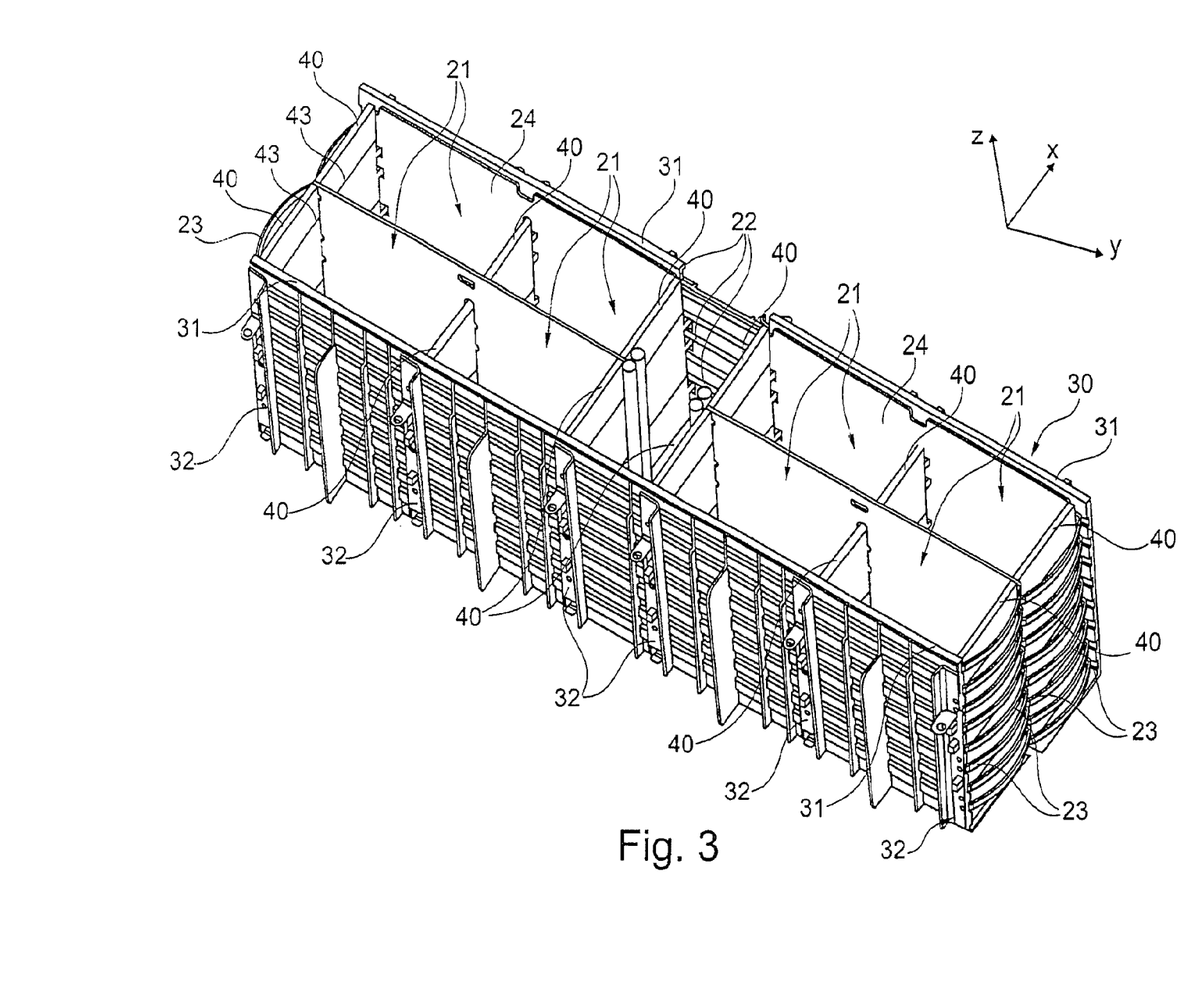
FIG. 3 is a perspective view of the exemplary cooler block according to the invention.

This feature is more readily apparent from the perspective view of an exemplary inventive cooler block 20 in FIG. 3. In this example the cooler block 20 includes eight holders 21 for respective storage cell modules. Four holders 21 are arranged in two rows positioned side by side in the longitudinal direction. According to the coordinate system in the drawing, the longitudinal direction of the cooler block 20 corresponds to the transverse axis of the vehicle (Y axis of the coordinate system). The support rails 32, which are distributed along the clamping plates 31, are easy to see in the perspective view. The support rails 32 are disposed on the side or between two holders 21.

The end sides of the cooler block 20 exhibit the cooling ducts 23, which are configured so as to form, for example, a curve and are flexible as stated above. The cooling ducts are located on the opposite sides of a holder 21 and connect together the cooling ducts 23 that are connected to the cooling plates 24. The curved contour of the cooling ducts 23 at the ends of a respective holder 21 allows the cooling ducts 23 a certain degree of flexibility when force is applied to the coolant or refrigerant conveying structure by way of the clamping device 30. The curved contour of the cooling ducts 23 of the holders 21 makes it possible to improve the reliability following installation of the device.

Two force absorbing elements, which are referred to hereinafter as the crash plates 40, are disposed between two support rails 32 in the X direction of the coordinate system shown in FIG. 3 (that is, in the longitudinal axis of the vehicle). The crash plates 40 define, together with the coolant or refrigerant conveying structure 22, a holder 21 for a storage cell module 10. The arrangement of the crash plates 40 can be seen more clearly in FIGS. 4 to 6.

Figure 4:
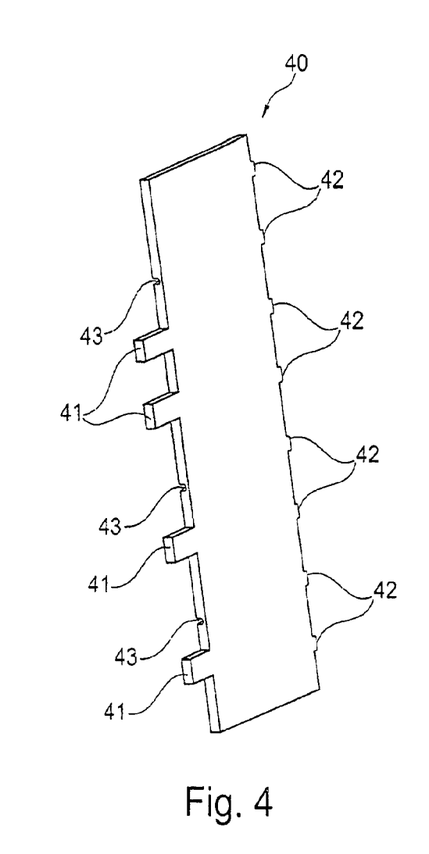
FIG. 4 is a view of a force absorbing element that is used in the exemplary cooler block according to the invention.
Figure 5:
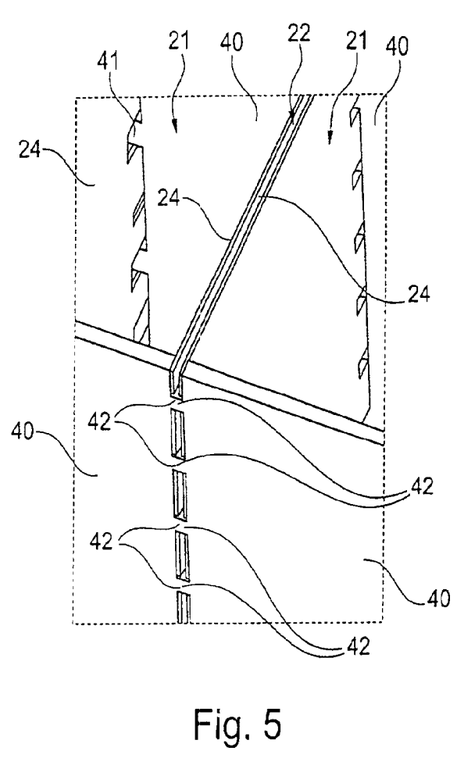
FIG. 5 is a perspective, exploded view of a cooler block in the area of two adjacent force absorbing elements.

FIG. 4 is an exploded view of a crash plate 40. The crash plate 40 has projections 41, which are called the crash pegs, along one lateral edge of the crash plate. Along the opposite lateral edge the crash plate 40 also has projections, which are called the crash pegs 42, but which are considerably shorter than the crash pegs 41. The crash pegs 41 extend through the coolant or refrigerant conveying structure, that is, the cooling plate 24, the clamping plate 31 and the support rail 32 (cf. FIGS. 5 and 6). The number of crash pegs 41 and/or 42 can be selected as desired.

In the event of a vehicle crash, the crash pegs 41 serve to absorb the forces acting on the device and to conduct the forces around the individual storage cells 12 of a respective storage cell module 10. The same purpose is fulfilled by the shorter crash pegs 42, which are in contact with the corresponding crash pegs 42 of an adjacent crash plate 40. This state can be inferred, for example, from the perspective views in FIGS. 5 and 6. The crash pegs 42 ensure that all of the forces that may be generated in the event of a crash are conducted through the device 1. In particular, it is also possible to avoid a deformation of the cooling plates 31 positioned in the center in the Y direction.

Figure 6:
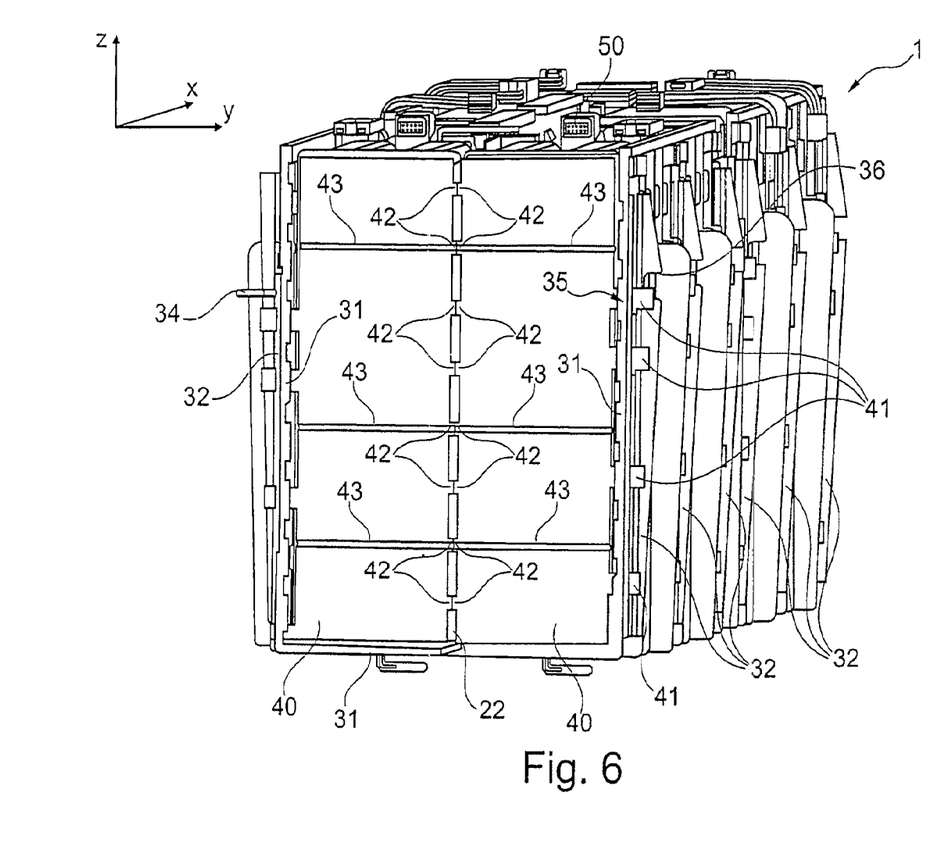
FIG. 6 is a perspective and cut view of an exemplary device for supplying power.

FIG. 6 is a perspective and cut view of an exemplary inventive device 1 for supplying power. Both the arrangement and the configuration of the crash plates 40 arranged in succession in the X (longitudinal direction of the vehicle) or Y direction (direction of the transverse axis of the vehicle) are readily apparent from the cut drawing. At the same time the arrangement of the crash pegs 41 and 42 relative to the structure 22 conveying the coolant or refrigerant, the clamping plate 31 as well as the support rail 32 and the arrangement of the crash pegs 42 of two crash plates 40 relative to each other can also be understood. Each crash plate 40 has a groove 43, which extends in the X direction over the entire width of the cooler block 20 or more specifically the device 1. The grooves 43 serve to guide and hold the connecting members 33 (not illustrated in FIG. 6), so that an additional design space minimization in the Y direction of the cooler block 20 is achieved.

Figure 9:
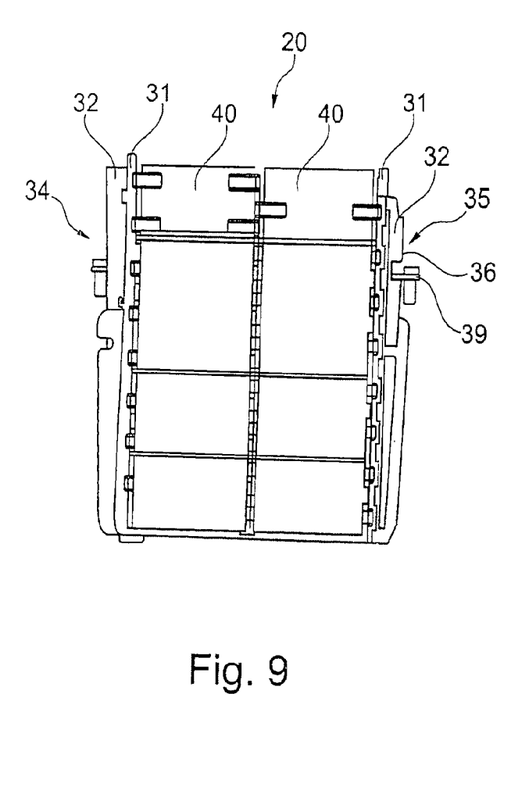
FIG. 9 is a cross sectional view of the cooler block illustrating its attachment to a component of a vehicle body.
Figure 10:
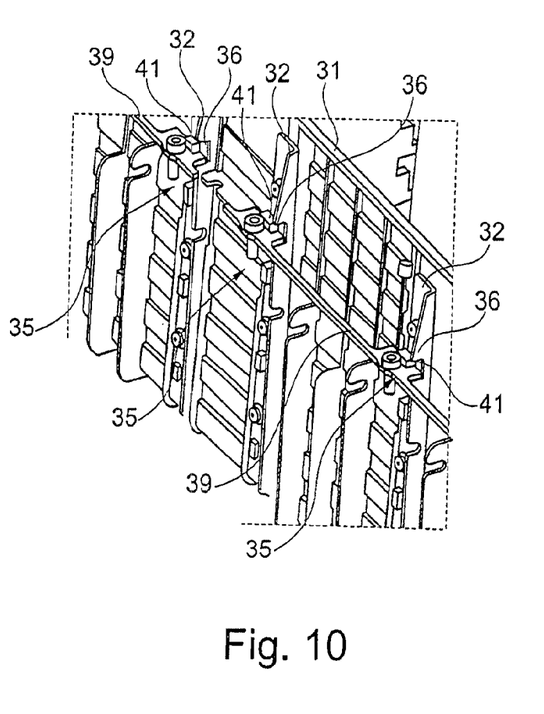
FIG. 10 is a partial perspective view of the cooler block illustrating a floating bearing on a vehicle body.

In addition, the clamping device makes it easier to install the device in a vehicle. The installation is done at the support rails 32 that are arranged on the opposing sides of the cooler block 20. To this end, the support rails 32 have a fixed bearing 34 on one side face of the cooler block 20. The fixed bearing 34 is formed by a section that curves out of the support rail 32 and exhibits an eyelet. This feature is more readily apparent, for example, from FIGS. 7, 8 and 9. At the eyelets the support rails and, thus, the cooler block 20 can be screwed to a body component of the vehicle. The opposite support rails 32 (cf. FIGS. 9 and 10) have in each case a seat or floating bearing 35 that allows a sliding motion in the X direction. In contrast, a motion in the Y direction and Z direction is suppressed. The floating bearing 35 is formed by the interaction of a groove 36 in the support rail 32 and a crash peg 41, so that a sheet metal 39 of the body component of the vehicle can be received in the slot formed between the crash pegs 41 and the groove 36. This feature is shown in the perspective view in FIG. 10.

In addition, the clamping device 30 makes it possible to hold an electronic component 50, for example, an electronic control unit of the device 1 for supplying power. As an alternative or in addition, electronic components can also be provided on the respective storage cell modules 10. Similarly it is possible to provide the electronic components at or on the first or second housing part 25, 26.

The enlarged drawing in FIG. 7 shows once again very clearly the basic construction of the cooler block. In particular, it is very clear that the crash pegs 41 not only extend through the coolant or refrigerant conveying structure 22 and the clamping plate 31, but also project through the recesses 37 into the support rails 32. In addition, the section of sheet metal that is configured as the fixed bearing 34 and that has the eyelet is easy to recognize.

Figure 7:
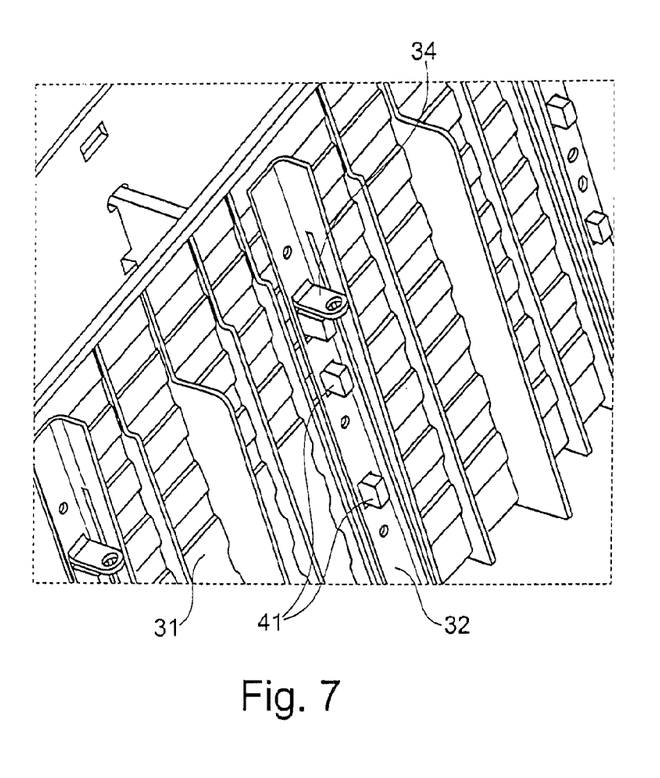
FIG. 7 is a partial perspective view of a cooler block illustrating the construction of a clamping device.
Figure 8:
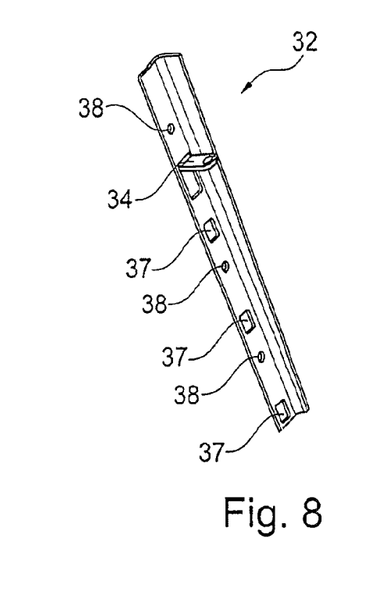
FIG. 8 shows a support rail used in a clamping device.

In FIG. 8 there are not only the rectangular recesses 37 but also round recesses 38. The connecting members 33 are guided through the round recesses 38, in order to generate the predefined force, with which the structure 22 conveying the coolant or refrigerant is pressed against a respective storage cell module 10. FIG. 7 shows that the round recesses 38 are located in the crash plates 40 on a level with the grooves 43, in order to allow the connecting members to be guided in a respective groove 43.

The cooler block 20 has preferably a self-supporting structure that facilitates its handling and installation. For this purpose, the cooler block is provided with clamping plates that are initially still in the extended state. The pre-finished storage cell modules 10, which includes, in particular, the profiles 13, described at the outset, are inserted into the respective holders of the cooler block 20. Then, the clamping is performed. A device that has been already processed in such a way can then be inserted into both housing parts.

In the above described exemplary embodiments the clamping device was described in conjunction with the clamping plates that are separate from the structure conveying the coolant or refrigerant.

Insofar as the cooling plates of the coolant or refrigerant conveying structure are adequately stable, it is possible to carry out the clamping procedure even by way of the cooling plates themselves under some circumstances. For this purpose the described support rails are used to distribute the force in an expedient way. The support rails are in direct contact with the cooling plates and press these cooling plates against the respective storage cell modules. Insofar as the cooling plates show adequate rigidity, there is no need for the support rails.

The advantage of the inventive approach lies in the good thermal contact of all of the components that are present in the thermally conductive path (storage cell-profile-cooling plate-cooling ducts). In this respect the thermal contact can be maintained over the entire service life of the device. The implementation is possible in a simple and cost-effective way. In particular, the clamping also provides for a stabilization of the coolant or refrigerant conveying structure after it has been clamped together. By providing the crash plates, the conditions for protecting the storage cells against penetrating parts during a crash are satisfied.

| Table of Reference Numerals | |
|---|---|
| 1 | device for supplying power |
| 10 | storage cell module |
| 12 | storage cell |
| 13 | profile |
| 20 | cooler block |
| 21 | holder for storage cell module 10 |
| 22 | structure conveying coolant |
| 23 | cooling duct |
| 24 | cooling plate |
| 25 | housing part (housing trough) |
| 26 | housing part (housing cover lid) |
| 30 | clamping device |
| 31 | clamping plate |
| 32 | support rail |
| 33 | connecting member |
| 34 | fixed bearing (eyelet) |
| 35 | floating bearing |
| 36 | groove in the support rail 32 |
| 37 | recess |
| 38 | recess |
| 40 | crash plate |
| 41 | crash peg (extending outwards) |
| 42 | crash peg (extending inwards) |
| 43 | groove for receiving/guiding the connecting member 33 |
| 50 | electronic component |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power supply device for a motor vehicle, comprising:
   at least two storage cell modules, each storage cell module comprising at least one of electrochemical storage cells or double layer capacitors arranged next to and/or on top of one another;
   a cooler block comprising a holder for the storage cell modules, a heat dissipating structure for dissipating heat emitted by the storage cell modules, and a force absorbing device, wherein the heat dissipating structure comprises cooling plates having cooling ducts configured for a coolant or a refrigerant, mounted, respectively, on at least opposing sides of the holder; and
   wherein the force absorbing device comprises at least one plate-shaped force absorbing element arranged between the at least two storage cell modules by which, in an event of a crash, a force acting on the power supply device is absorbed and deflected around the at least two storage cell modules;
   wherein the cooler block comprises a clamping device having a clamping plate arranged on each side of the heat dissipating structure facing away from the storage cell module; and
   wherein the clamping device comprises a plurality of connecting members operatively configured to generate a predefined force and to transmit said predefined force to the heat dissipating structure.

2. The device according to claim 1, wherein the at least one plate-shaped force absorbing element projects, at least in sections, beyond the cooler block.

3. The device according to claim 2, wherein the at least one plate-shaped force absorbing element is operatively configured to interact with one or more components surrounding the cooler block.

4. The device according to claim 1, wherein the at least one plate-shaped force absorbing element extends laterally past the storage cell modules.

5. The device according to claim 1, further comprising:
   at least two force absorbing elements, each force absorbing element being assigned to a respective holder, the holders for each of the two force absorbing elements being adjacent to one another; and
   wherein the at least two force absorbing elements are arranged in succession in a force conducting direction.

6. The device according to claim 5, wherein at least one of the two force absorbing elements has pegs extending through the cooler block and projecting beyond the cooler block.

7. The device according to claim 6, wherein respective pegs of the successively arranged force absorbing elements are arranged in juxtaposition relative to one another.

8. The device according to claim 1, wherein the at least one plate-shaped force absorbing element extends in one of a longitudinal axis and transverse axis direction of the vehicle when the power supply device is installed in the vehicle.

9. The device according to claim 1, wherein the heat dissipating structure is pressable against a respective storage cell module by said predefined force.

10. The device according to claim 9, wherein the cooling ducts being flow-connected on an end said of the holder via flexible cooling ducts.

11. The device according to claim 10, wherein the plurality of connecting members connect together the clamping plates via at least one of a force-fit and material bond.

12. The device according to claim 10, wherein the plurality of connecting members connect together via a force and/or form-fit the cooling plates mounted on opposing sides of the holder.

13. The device according to claim 12, further comprising one or more support rails made of a rigid material; and
   wherein the plurality of connecting members is connected directly or indirectly to the cooling plates or clamping plates via the one or more support rails.

14. The device according to claim 1, wherein at least some of the plurality of connecting members extend through the holder.

15. The device according to claim 14, wherein a respective connecting member extends laterally past a storage cell module or between the two storage cell modules.

16. The device according to claim 15, wherein the plate-shaped force absorbing element extends in a direction corresponding to an extending direction of the connecting members.

17. The device according to claim 9, further comprising thermally conducting and mechanically rigid profiles operatively configured to connect together a plurality of storage cells and/or double layer capacitors of a storage cell module; and
   wherein the clamping device presses the heat dissipating structure against the thermally conducting and mechanically rigid profiles.

18. The device according to claim 17, wherein the clamping device comprises at least one fixed bearing on one side of the holder and at least one floating bearing on the other side of the holder, said bearings being operatively configured to secure the power supply device in the vehicle.

19. The device according to claim 1, wherein the cooler block is self-supporting.

20. A cooler block for a power supply device for a motor vehicle, the power supply device comprising at least two storage cell modules, each storage cell module comprising at least one of electrochemical storage cells or double layer capacitors arranged next to and/or on top of one another, the cooler block comprising:
- a holder for the storage cell modules; a heat dissipating structure for dissipating heat emitted by the storage cell modules, wherein the heat dissipating structure comprises cooling plates having cooling ducts configured for a coolant or a refrigerant, mounted, respectively, on at least opposing sides of the holder; and
- a force absorbing device comprising at least one plate-shaped force absorbing element arranged between the at least two storage cell modules, said force absorbing element absorbing a crash induced force acting on the power supply device and deflecting said force around the at least two storage cell modules;
- wherein the cooler block comprises a clamping device having a clamping plate arranged on each side of the heat dissipating structure facing away from the storage cell module; and
- wherein the clamping device comprises a plurality of connecting members operatively configured to generate a predefined force and to transmit said predefined force to the heat dissipating structure.

* * * * *